(12) United States Patent
Yoshikawa

(10) Patent No.: US 9,151,772 B2
(45) Date of Patent: Oct. 6, 2015

(54) SPEED DETECTION DEVICE

(75) Inventor: Hiroshi Yoshikawa, Chiyoda-ku (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 622 days.

(21) Appl. No.: 13/582,313

(22) PCT Filed: Mar. 16, 2010

(86) PCT No.: PCT/JP2010/054428
§ 371 (c)(1),
(2), (4) Date: Aug. 31, 2012

(87) PCT Pub. No.: WO2011/114438
PCT Pub. Date: Sep. 22, 2011

(65) Prior Publication Data
US 2012/0323523 A1  Dec. 20, 2012

(51) Int. Cl.
*G01P 11/00* (2006.01)
*G01P 15/00* (2006.01)
*G01P 3/489* (2006.01)
*G06F 7/499* (2006.01)
*G01P 3/481* (2006.01)

(52) U.S. Cl.
CPC ............ *G01P 3/489* (2013.01); *G06F 7/4991* (2013.01); *G01P 3/481* (2013.01)

(58) Field of Classification Search
CPC ........ G01P 3/481; G01P 3/489; G06F 7/4991
See application file for complete search history.

(56) References Cited

U.S. PATENT DOCUMENTS

| 5,289,517 A * | 2/1994 | Ohba et al. ............... 377/44 |
| 5,388,053 A * | 2/1995 | Kurihara et al. .......... 702/79 |
| 6,219,624 B1 * | 4/2001 | Russ ........................ 702/75 |
| 2007/0016347 A1 | 1/2007 | Yoshida |

FOREIGN PATENT DOCUMENTS

| JP | 59100866 A * | 6/1984 | ............ G01P 3/489 |
| JP | 59-214920 A | 12/1984 | |
| JP | 6-018538 A | 1/1994 | |

(Continued)

OTHER PUBLICATIONS

Li et al. "The measurement of instantaneous angular speed" Mechanical Systems and Signal Processing 19 (2005) 786-805.*

(Continued)

*Primary Examiner* — Mohamed Charioui
*Assistant Examiner* — John Kuan
(74) *Attorney, Agent, or Firm* — Buchanan Ingersoll & Rooney

(57) ABSTRACT

To include a pulse counting unit, a pulse timing unit, an overflow detection unit that holds a detected matter in an overflow register, a capture unit that holds an output of the pulse counting unit in a pulse counting register and holds an output of the pulse timing unit in a pulse timing register, and a computation unit (frequency calculation unit) that reads the pulse counting register, the pulse timing register, and the overflow register to calculate a frequency computation value, and when the pulse timing unit has overflowed, the computation unit adds a predetermined constant acquired by a period of a capture clock a period of a timing clock to pulse timing data at the previous interrupt to obtain pulse timing data acquired by a period of time from the last pulse edge a period of the timing clock.

10 Claims, 15 Drawing Sheets

(56) References Cited

FOREIGN PATENT DOCUMENTS

| JP | 7-057346 A | 3/1995 |
|---|---|---|
| JP | 8-136563 A | 5/1996 |
| JP | 8-233842 A | 9/1996 |
| JP | 2000-074962 A | 3/2000 |
| JP | 2007-045395 A | 2/2007 |
| JP | 2007-075395 A | 3/2007 |

OTHER PUBLICATIONS diCenzo et al. "Digital measurement of angular velocity for instrumentation and control" IEEE Transactions on Industrial Electronics and Control Instrumentation IECI 23 (1) (1976) 83-86.*

Prokin, "Extremely wide-range speed measurement using a double-buffered method" IEEE Transactions on Industrial Electronics 41 (5) (1994) 550-559.*

International Search Report (PCT/ISA/210) issued on Jun. 15, 2010, by the Japanese Patent Office as the International Searching Authority for International Application No. PCT/JP2010/054428.

Written Opinion (PCT/ISA/237) issued on Jun. 15, 2010, by the Japanese Patent Office as the International Searching Authority for International Application No. PCT/JP2010/054428.

Decision of a Patent Grant issued on Dec. 20, 2011, by the Japanese Patent for Application No. 2011-532411.

* cited by examiner

EXAMPLE OF DESIGNING PROCEDURE OF FOURTH EMBODIMENT

PROCESSING CONTENTS OF BUFFER PROCESSING UNIT

PROCESSING CONTENTS OF COMPUTATION PROCESSING UNIT

SPEED DETECTION DEVICE

FIELD

The present invention relates to a speed detection device that detects an alternating-current signal having a frequency proportional to a speed, a rotation rate, the number of rotations or the like of a moving object.

BACKGROUND

Conventionally, a device that detects a speed of a moving object (an electric vehicle or the like) from a pulse signal and uses the detected speed for various controls (for example, prevention of idling and sliding) has been well known. Examples of such a speed detection device are described in Patent Literatures 1 and 2 mentioned below.

CITATION LIST

Patent Literatures

Patent Literature 1: Japanese Laid-open Patent Publication No. 8-233842
Patent Literature 2: Japanese Laid-open Patent Publication No. 8-136563

SUMMARY

Technical Problem

However, in a speed detection device described in Patent Literature 1 mentioned above, a capture period as a period for acquiring a set of a pulse counting register and a pulse timing register is not constant, thereby causing a problem that a digital filtering process is difficult to be performed at a subsequent stage. Therefore, when the digital filtering process is performed at the subsequent stage, a frequency is acquired by using a set of the latest pulse counting register and pulse timing register acquired at that time for each calculation period of a microprocessor to perform buffering. Therefore, there is a problem that a part of data may be discarded without being used according to the circumstances, thereby causing accuracy deterioration of the frequency.

In a speed detection device described in Patent Literature 2 mentioned above, there is a problem that a counter value for measuring a pulse time is latched at a pulse edge, and is further latched by a capture clock, thereby causing a problem that extra hardware resources are required.

Furthermore, in the speed detection device described in Patent Literature 2 mentioned above, there is a problem that measures taken when any pulse edge is not input in a predetermined period and when an overflow has occurred are not clearly specified.

The present invention has been achieved in view of the above problems, and an object of the present invention is to provide a speed detection device in which there is no accuracy deterioration of frequency, data is constantly updated, its circuit size is relatively small, and has less software overhead.

Solution to Problem

In order to solve above-mentioned problems and achieve the object of the present invention, there is provided a speed detection device comprising: a pulse counting unit that counts number of pulses of an input signal from outside; a pulse timing unit that counts up a value by a timing clock and the value is cleared by a pulse, thereby measuring a period of time from a last pulse; an overflow detection unit that detects that the pulse timing unit has overflowed and holds a detected result in an overflow register; a capture unit that holds an output from the pulse counting unit in a pulse counting register and holds an output from the pulse timing unit in a pulse timing register, by outputting an interrupt request at a timing of a capture clock for acquiring a measurement result at each constant period; and a frequency calculation unit that reads a value of the pulse counting register, a value of the pulse timing register, and a value of the overflow register to calculate a frequency computation value by a predetermined computation, wherein when the pulse timing unit has overflowed, the frequency calculation unit adds a predetermined constant acquired by a period of the capture clock/a period of the timing clock at a previous interrupt to pulse timing data, which is a period of time from the last pulse/a period of the timing clock at a previous interrupt, to obtain pulse timing data, which is a period of time from the last pulse/a period of the timing clock, thereby calculating the frequency computation value, and when the number of pulses input during a predetermined period is 0, the frequency calculation unit estimates a frequency computation value by selecting a lower one a frequency computation value obtained by assuming that a pulse is input immediately thereafter or a previous frequency computation value.

Advantageous Effects of Invention

According to the present invention, because the capture period is made constant, there is no accuracy deterioration of frequency, data is constantly updated, a circuit size is relatively small, and software overhead can be reduced.

DESCRIPTION OF EMBODIMENTS

Exemplary embodiments of a speed detection device according to the present invention will be explained below in detail with reference to the accompanying drawings. The present invention is not limited to the embodiments.

First Embodiment

Figure 1:
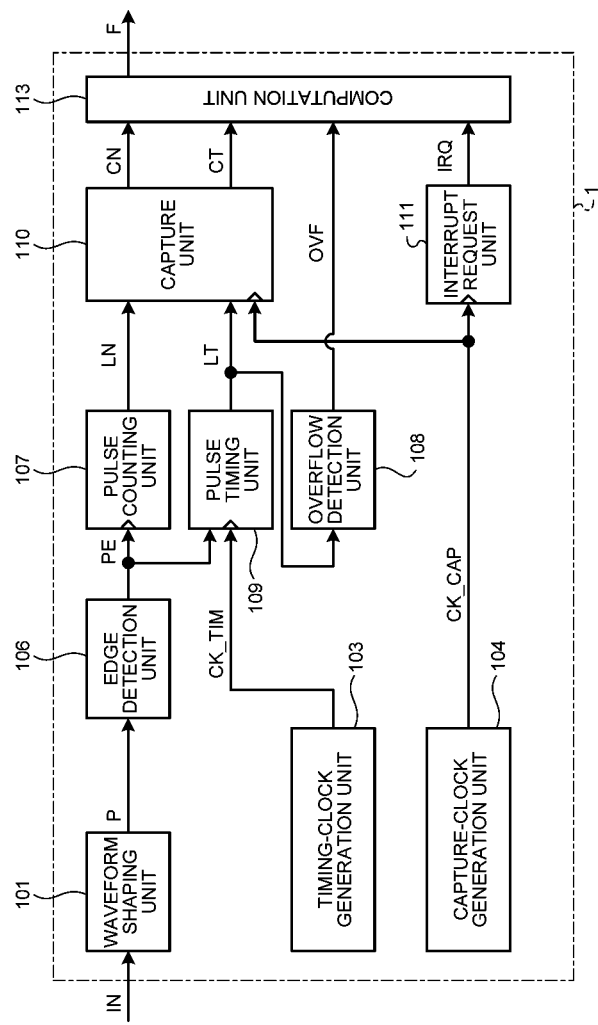
FIG. 1 is a configuration example of a speed detection device according to a first embodiment of the present invention.

FIG. 1 is a configuration example of a speed detection device according to a first embodiment of the present invention. The function of a speed detection device 1 is to detect a frequency of an input signal IN. The diagrams related to the first embodiment are FIGS. 1 to 9.

The speed detection device 1 according to the first embodiment includes, as primary constituent elements, a waveform shaping unit 101, an edge detection unit 106, a pulse counting unit 107, a timing-clock generation unit 103, a pulse timing unit 109, a capture-clock generation unit 104, an overflow detection unit 108, a capture unit 110, an interrupt request unit 111, and a computation unit (frequency calculation unit) 113.

The speed detection device 1 is described as a single device in FIG. 1; however, the speed detection device 1 may be a partial function of a certain device. The name thereof does not need to be the speed detection device, and may be also referred to as " controller" or " control system".

In the present specification, the same variable name is mentioned in the right-hand member and the left-hand member of an expression. In this case, it means that a previous value of the variable shown in the right-hand member is used.

The waveform shaping unit 101 shapes the waveform of the input signal IN to convert the input signal IN to a square wave (a pulse signal P), and provides electrical insulation between the input signal IN and a signal inside the device by using a photocoupler or the like.

The edge detection unit 106 detects only one of a rising edge or a falling edge of the pulse signal P, and outputs it as a pulse edge (a pulse) PE. The pulse edge PE has a predetermined pulse width H only for a moment when the edge has been detected, and in other cases, has a width L.

The timing-clock generation unit 103 generates a timing clock CK_TIM for the pulse timing unit 109 to measure the time.

The capture-clock generation unit 104 generates a capture clock CK_CAP as a timing for acquiring a measurement result at each constant period.

The pulse counting unit 107 is configured such that an initial state of an output value is 0, and the output value is counted up by the pulse edge PE from the edge detection unit 106. That is, the counter does not have a reset condition, and operates in a free-run mode.

The pulse timing unit 109 counts up by the timing clock CK_TIM from the timing-clock generation unit 103, and is cleared by the pulse edge PE from the edge detection unit 106, thereby measuring a period of time from the last pulse edge PE.

The capture unit 110 holds a live-pulse count value LN from the pulse counting unit 107 in a pulse counting register CN at a timing of the capture clock CK_CAP from the capture-clock generation unit 104. Furthermore, the capture unit 110 holds a live-pulse timing value LT from the pulse timing unit 109 in a pulse timing register CT at the timing of the capture clock CK_CAP from the capture-clock generation unit 104.

Relations among the pulse timing unit 109, the capture unit 110, and the overflow detection unit 108 are explained here. The pulse timing unit 109 measures the time from the pulse edge PE input last, and when a capture has occurred, the capture unit 110 captures an instantaneous value thereof. That is, the capture unit 110 holds the time since the last input pulse edge PE until the capture occurs. This timer (the pulse timing unit 109) only needs to prepare a bit width capable of sufficiently measuring the period of time of a capture period Tcap, and when the pulse edge PE is not input for a period longer than that, the timer overflows, and the overflow is detected by the overflow detection unit 108.

The interrupt request unit 111 outputs an interrupt request IRQ at the timing of the capture clock CK_CAP from the capture-clock generation unit 104. Furthermore, the interrupt request unit 111 cancels the interrupt request IRQ according to an interrupt-request clearing request ICRQ (not shown) from the computation unit 113. The interrupt-request clearing request ICRQ is described later.

Figure 2:
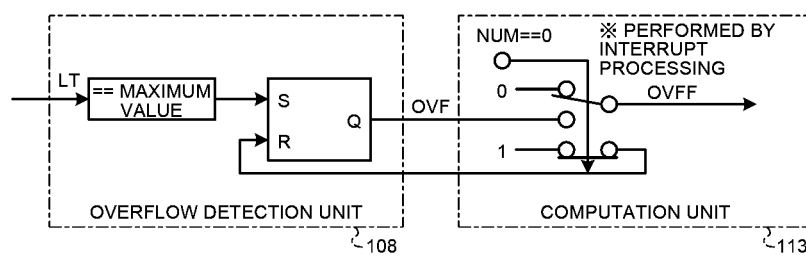
FIG. 2 is a configuration example of an overflow detection unit and a computation unit in FIG. 1.

FIG. 2 is a configuration example of the overflow detection unit and the computation unit in FIG. 1. The overflow detection unit 108 detects that the live-pulse timing value LT from the pulse timing unit 109 has exceeded a predetermined maximum value to set an overflow register OVF (OVF=1), and holds the overflow register OVF until it is reset by the computation unit 113.

Even when the overflow register OVF has been set, if there is a difference between a value of the pulse counting register at a previous interrupt and a value of the pulse counting register at a current interrupt, the computation unit 113 determines that an overflow has not occurred, and resets the overflow register OVF. Furthermore, when there is no difference between the value of the pulse counting register at the previous interrupt and the value of the pulse counting register at the current interrupt, the computation unit 113 determines whether an overflow has occurred based on a value of the overflow register OVF. It is set in an overflow flag OVFF whether an overflow has occurred.

Figures 7, 8:
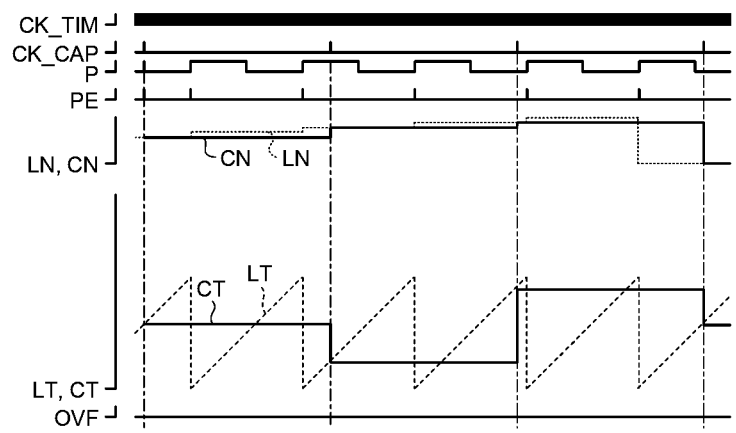
FIG. 7 is an explanatory diagram of processing contents of the computation unit in FIG. 1.
FIG. 8 is an explanatory diagram of a movement of a hardware part of the speed detection device in FIG. 1.
Figure 9:
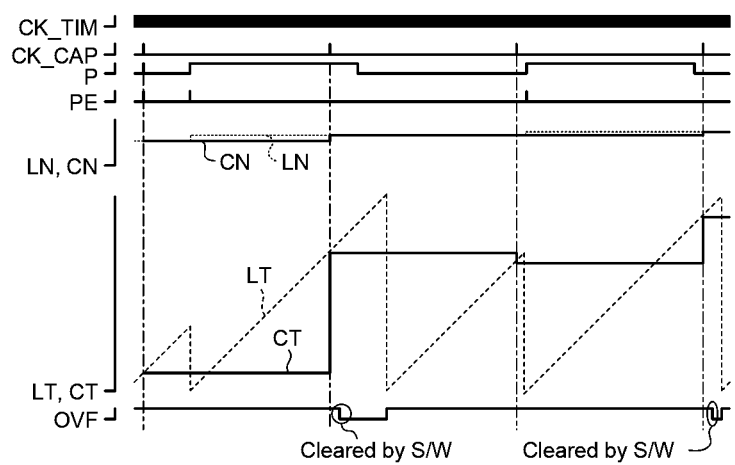
FIG. 9 is an explanatory diagram of another movement of the hardware part of the speed detection device in FIG. 1.

An example of a movement of the speed detection device 1 according to the first embodiment is shown in FIGS. 8 and 9.

FIG. 8 is an explanatory diagram of a movement of a hardware part of the speed detection device in FIG. 1. A timing chart of each signal when an overflow has not occurred is shown in FIG. 8. The live-pulse count value LN is counted up according to the pulse edge PE, and held in the pulse counting register CN at the timing of the capture clock CK_CAP. The live-pulse timing value LT is increased upon an input of the last pulse edge PE until it is cleared by the next pulse edge PE, and held in the pulse timing register CT at the timing of the capture clock CK_CAP.

FIG. 9 is an explanatory diagram of another movement of the hardware part of the speed detection device in FIG. 1. A timing chart of each signal when an overflow has occurred is shown in FIG. 9. The live-pulse count value LN is held in the pulse counting register CN, and the live-pulse timing value LT is held in the pulse timing register CT.

For example, in FIG. 9, the computation unit 113 determines that an overflow has not occurred, because there is a difference between the value of the pulse counting register at the previous interrupt and the value of the pulse counting register at the current interrupt after the second capture clock CK_CAP, and clears the value of the overflow register OVF. The live-pulse timing value LT has exceeded the predetermined maximum value between the second capture clock CK_CAP and the third capture clock CK_CAP in FIG. 9. Therefore, the overflow detection unit 108 sets the overflow register OVF (OVF=1). The computation unit 113 determines that an overflow has occurred, because there is no difference between the value of the pulse counting register at the previous interrupt and the value of the pulse counting register at the current interrupt and the value of OVF is 1.

Figure 5:
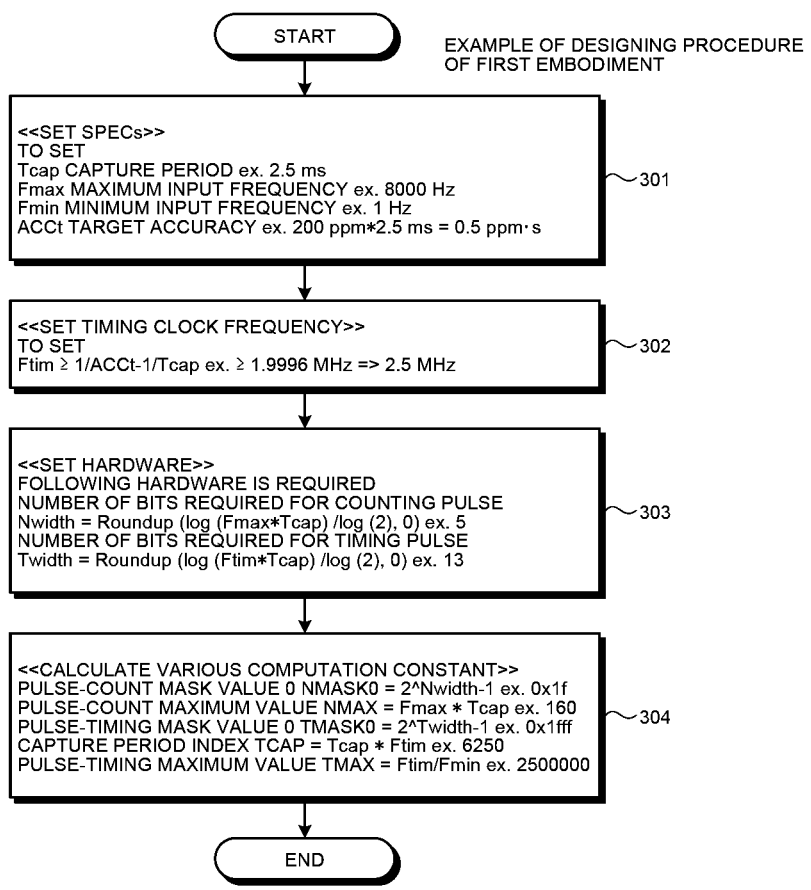
FIG. 5 is an example of a designing procedure of the speed detection device in FIG. 1.

FIG. 5 is an example of a designing procedure of the speed detection device in FIG. 1. An example of the designing procedure of the speed detection device 1 is explained below.

Specs Setting Step 301

The capture period Tcap, a maximum input frequency Fmax, a minimum input frequency Fmin, and a target accuracy ACCt are set. For example, these are set as follows:

Capture period Tcap=2.5 ms (milliseconds),
Maximum input frequency Fmax=8000 Hz (hertz),
Minimum input frequency Fmin=1 Hz,
Target accuracy ACCt=200 ppm×2.5 ms=0.5 ppm·s.

Timing-Clock Frequency Setting Step 302

Timing clock frequency Ftim≥1/ACCt−1/Tcap (for example, ≥1.9996 MHz (megahertz), and it is set to 2.5 MHz here.)

Hardware Setting Step 303

Number of bits required for counting pulse: Nwidth=Roundup(log(Fmax×Tcap)/log(2), 0)

Number of bits required for timing pulse: Twidth=Roundup(log(Ftim×Tcap)/log(2), 0)

For example, the both values become 5 and 13, respectively. Therefore, the number of bits of the pulse counting unit 107 is set to 5, and the number of bits of the pulse timing unit 109 is set to 13.

Various Computation Constant Calculation Step 304

Various constants are obtained. These values are used by the computation unit 113 described later.

| Pulse-count mask value 0 | NMASK0 = 2^Nwidth−1 |
| Pulse-count maximum value | NMAX = Fmax × Tcap |
| Pulse-timing mask value 0 | TMASK0 = 2^Twidth−1 |
| Capture period index | TCAP = Tcap × Ftim |
| Pulse-timing maximum value | TMAX = Ftim/Fmin |

For example, the above values become 0x1f, 160, 0x1fff, 6250, and 2500000, respectively.

Figure 6:
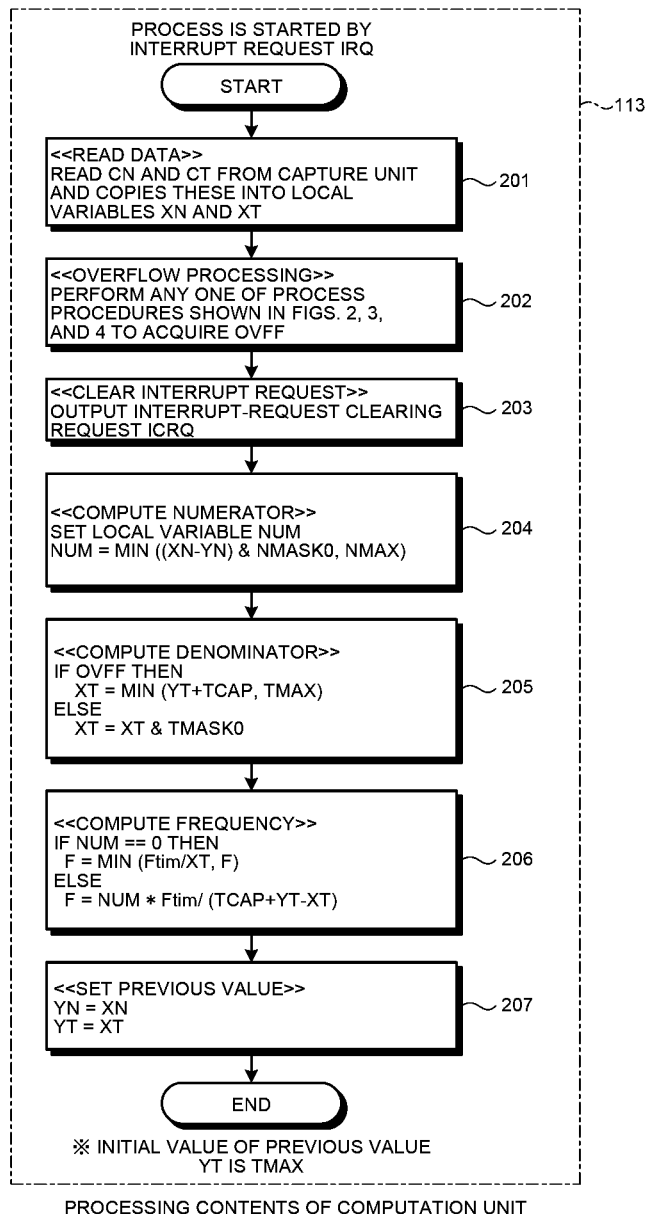
FIG. 6 is an example of a process procedure of the computation unit in FIG. 1.

FIG. 6 is an example of a process procedure of the computation unit in FIG. 1. The computation unit 113 is started by the interrupt request IRQ, and includes, as primary constituent elements, a data read step 201, an overflow processing step 202, an interrupt-request clearing step 203, a numerator computing step 204, a denominator computing step 205, a frequency computing step 206, and a previous-value setting step 207. The timing clock frequency is 1/timing clock frequency Ftim.

Read Step 201

The computation unit 113 reads CN and CT from the capture unit 110 and copies these into local variables XN and XT.

Overflow Processing Step 202

Figure 3:
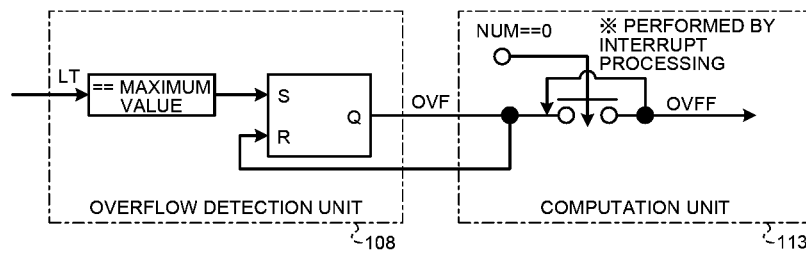
FIG. 3 is a configuration example of an overflow detection unit and a computation unit of a speed detection device according to a second embodiment of the present invention.
Figure 4:
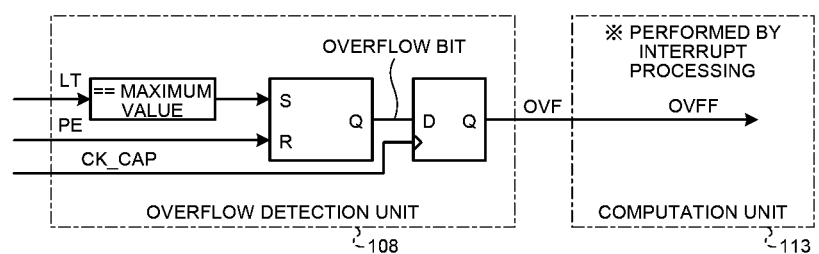
FIG. 4 is a configuration example of an overflow detection unit and a computation unit of a speed detection device according to a third embodiment of the present invention.

The computation unit 113 performs any one of process procedures shown in FIGS. 2, 3, and 4 to acquire the overflow flag OVFF.

Interrupt-Request Clearing Step 203

The computation unit 113 outputs the interrupt-request clearing request ICRQ.

Numerator Computing Step 204

The computation unit 113 obtains a local variable NUM according to the following equation.

$$NUM=MIN((XN-YN)\&NMASK0,NMAX)$$

That is, the number of the pulse edges NUM input during a period from the last interrupt and the current interrupt (during the capture period Tcap immediately before) is obtained based on a value obtained by subtracting a value (YN) of the pulse counting register at the previous interrupt from a value (XN) of the pulse counting register at the current interrupt.

Denominator Computing Step 205

The computation unit 113 obtains XT according to the following equation.

When OVFF=0, that is, when there is no overflow, $$XT=XT\&TMASK0.$$

That is, when the pulse timing unit 109 has not overflowed, the computation unit 113 obtains pulse timing data XT based on the value of the pulse timing register CT.

In other cases, that is, when the pulse timing unit 109 has overflowed, $$XT=MIN(YT+TCAP,TMAX).$$

Setting when the pulse timing unit 109 has overflowed is calculated from the previous value YT, because the pulse timing register CT is invalid due to the overflow. However, an upper limit TMAX is provided. Because values are added by software, there is a concern of accuracy deterioration of frequency. However, accuracy deterioration does not occur. When the bit width of the pulse timing unit 109 is sufficient, the bit width increases by the capture period index TCAP during the time of the capture period Tcap. Therefore, there is no accuracy deterioration of frequency due to this. Hardware (the pulse timing unit 109) takes charge of for a short period of time and the software takes charge of for a long period of time. That is, when the pulse timing unit 109 has overflowed, the computation unit 113 adds a predetermined value of constant (TCAP) obtained by capture clock period/timing clock period to the previous pulse timing data (YT) to obtain pulse timing data (XT), which is a period of time from the last pulse edge PE/timing clock period.

Frequency Computing Step 206

The computation unit 113 calculates a frequency computation value F according to the following arithmetic expression by using the pulse timing data (XT) obtained at step 205.

When NUM=0, $$F=MIN(Ftim/XT,F).$$

That is, when the number of the pulse edges PE input during a predetermined period is 0, the computation unit 113 estimates the frequency computation value F by selecting the lower one of a value of the frequency computation value (Ftim/XT) obtained by assuming that the pulse edge PE is input immediately thereafter or the previous frequency computation value F.

In other cases, $$F = NUM \times Ftim/(TCAP+YT-XT).$$

Previous-Value Setting Step 207

The computation unit 113 stores XT and XN in the previous values YT and YN for the next computation. Note that the previous value YT needs to be initialized by the pulse-timing maximum value TMAX.

The process of the computation unit 113 is explained with reference to FIG. 7. FIG. 7 is an explanatory diagram of processing contents of the computation unit in FIG. 1. A CASE 1 represents a case where at least one pulse edge PE is input during a period from an input of the first capture clock CK_CAP to an input of the second capture clock CK_CAP. In FIG. 7, the number of the pulse edges PE, that is, NUM is 12, and there are 12 pulse periods in a section described as (TCAP+YT−XT)/Ftim. Therefore, it is understood that the value of NUM does not have any problem as a numerator of an equation for obtaining the frequency computation value F.

Regarding the denominator of the equation for obtaining the frequency computation value F, that is, the time for 12 periods, it is obvious that (TCAP+YT−XT)/Ftim is correct because the left side becomes longer by YT/Ftim and the right side becomes shorter by XT/Ftim than the time described as TCAP/Ftim, as can be understood from (TCAP+YT-XT)/Ftim.

Therefore, it is understood that "F=NUM×Ftim/(TCAP+YT−XT)" is correct as an equation for obtaining the frequency computation value F.

Next, in a CASE 2, no pulse edge PE is input during the period from an input of the first capture clock CK_CAP to an input of the second capture clock CK_CAP (the predetermined period). At this time, it cannot be said that there is no information because no pulse edge PE has been input. It means that only XT/Ftim has passed since the last pulse edge PE at the present moment. Therefore, it is obvious that the frequency is smaller than Ftim/XT. Accordingly, the computation unit 113 outputs the previous frequency computation value F or Ftim/XT, whichever smaller, as a new frequency computation value F. That is, an equation "F=MIN(Ftim/XT, F)" is used.

As described above, even when the number of pulse edges input during the predetermined period is 0, the computation unit 113 estimates the frequency computation value F by selecting the lower one of a value of the frequency computation value obtained by assuming that the pulse edge PE is input immediately thereafter (that is, a value obtained by timing clock frequency/pulse timing data) or the previous frequency computation value (F).

Figure 18:
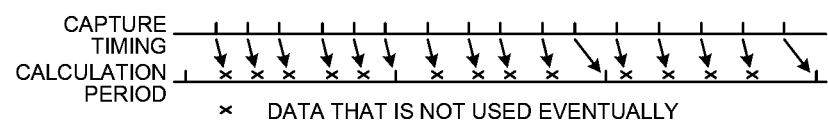
FIG. 18 is an example of accuracy deterioration of a speed detection device described in Patent Literature 1.

FIG. 18 is an example of accuracy deterioration of the speed detection device described in Patent Literature 1. In FIG. 18, the capture period Tcap (a capture timing), which is a period during which a set of the pulse counting register and the pulse timing register are acquired, and a calculation period Tcal on the microprocessor side are shown. As shown in FIG. 18, in the speed detection device described in Patent Literature 1, because the capture period Tcap is not constant, when the digital filtering process is provided at a subsequent stage, a set of the latest pulse counting register and the pulse timing register acquired for each calculation period on the microprocessor side is used to obtain the frequency, and buffering is performed. Accordingly, as shown in FIG. 18, partial data is discarded uselessly, and this causes accuracy deterioration in frequency. On the other hand, in the speed detection device 1 according to the first embodiment, such a problem may not occur.

As explained above, the speed detection device 1 according to the first embodiment includes the pulse counting unit 107, the pulse timing unit 109, the timing-clock generation unit 103, the capture-clock generation unit 104, the overflow detection unit 108, the capture unit 110, and the computation unit 113, and the capture period Tcap is set to be constant. Therefore, there is not such a case that partial data is discarded without being used as in the speed detection device described in Patent Literature 1, and accuracy deterioration of frequency does not occur.

The speed detection device 1 according to the first embodiment regularly acquires data (the frequency computation value F) by the capture clock CK_CAP, regardless of whether the pulse edge PE is input, to update data. Therefore such a problem that data is not updated if no pulse edge PE is input, as in the speed detection device described in Patent Literature 1 mentioned above, does not occur. That is, in the speed detection device described in Patent Literature 1, if no pulse edge PE is input, the latest frequency computation value F cannot be obtained because the set of the pulse counting register and the pulse timing register (the capture period Tcap) cannot be acquired. Furthermore, as a measure against it, a pulse missing detection unit that detects that a pulse signal has not been input for a long time needs to be provided, to perform a process of recognizing that the frequency computation value is 0, when a pulse is missing. However, in the speed detection device 1 according to the first embodiment of the present invention, such a pulse missing detection unit is not required.

In the speed detection device 1 according to the first embodiment, because data acquisition is performed regularly by the capture clock CK_CAP, a large value does not need to be stored in a hardware timer, and thus a low frequency can be handled by considerably small resources. That is, in the speed detection device described in Patent Literature 1, to make it possible to recognize a low frequency, a time measuring circuit having a capacity capable of measuring a time for a period corresponding to the frequency needs to be provided. For example, when a timing is performed by a pulse timing unit with a timing clock=1 MHz and a width of 16 bits, a lower limit frequency will be a frequency capable of measuring 1 MHz/65536=15.3 Hz. In this manner, in the speed detection device described in Patent Literature 1, large hardware resources have been required to handle a low frequency; however, such large hardware resources are not required in the speed detection device 1 according to the first embodiment of the present invention.

In the speed detection device 1 according to the first embodiment, a counter for measuring a pulse time can be formed by only one latch (in the present embodiment, the pulse timing register CT of the capture unit 110). That is, in a speed detection device described in Patent Literature 2, double latches are required so that a value of a counter for measuring a pulse time is latched by a pulse edge and further latched by a capture clock. However, in the speed detection device 1 according to the first embodiment of the present invention, extra hardware resources are not required.

The speed detection device 1 according to the first embodiment is configured such that when the pulse timing unit 109 has overflowed, the predetermined value of constant (TCAP) acquired by capture clock period/timing clock period is added to the pulse timing data (YT) at the previous interrupt, thereby obtaining the pulse timing data (XT) which is a time since the last pulse edge PE/timing clock period. In the speed detection device described in Patent Literature 2, the processing contents when an overflow has occurred are not specified. However, the processing contents are clearly specified in the speed detection device 1 according to the first embodiment of the present invention.

In the speed detection device 1 according to the first embodiment, when the number of pulse edges input during the predetermined period is 0, the lower one of the frequency computation value obtained by assuming that the pulse edge PE is input immediately thereafter or the previous frequency computation value is selected. Therefore, the frequency computation value F can be regularly obtained by the timing clock CK_TIM, regardless of whether the pulse edge PE is input. In the speed detection device described in Patent Literature 2, the processing contents when no pulse edge PE has been input during a predetermined period are not specified. However, the processing contents are clearly specified in the speed detection device 1 according to the first embodiment of the present invention.

Second Embodiment

A case where an overflow detection method is slightly different is explained next. In the first embodiment, the overflow register OVF of the overflow detection unit 108 manages whether there is an overflow. In a second embodiment, a memory manages whether there is an overflow. Because features other than this are identical to those of the first embodiment, only the feature different from the first embodiment is explained.

FIG. 3 is a configuration example of an overflow detection unit and a computation unit of a speed detection device according to the second embodiment of the present invention. The overflow detection unit 108 is identical to that of the first embodiment.

The computation unit 113 is configured to determine whether there is an overflow and holds the overflow flag OVFF in the memory. When the overflow register OVF is set, the computation unit 113 determines that an overflow has occurred and sets the overflow flag OVFF, and clears the overflow register OVF of the overflow detection unit 108. Furthermore, when there is a difference between a value of the pulse counting register at the previous interrupt and a value of the pulse counting register at the current interrupt, the computation unit 113 determines that an overflow has not occurred and clears the overflow flag OVFF.

Operations of the overflow detection unit 108 and the computation unit 113 in FIG. 3 are explained here. The overflow detection unit 108 in FIG. 3 sets the overflow register OVF when the live-pulse timing value LT has exceeded the maximum value. The computation unit 113 sets the overflow flag OVFF by an interrupt process, holds the overflow flag OVFF, and clears the overflow register OVF of the overflow detection unit 108. That is, when the overflow register OVF changes from 0 to 1, the overflow flag OVFF is held and the overflow register OVF is cleared.

As explained above, the speed detection device 1 according to the second embodiment is configured to determine whether an overflow has occurred and to hold the overflow flag OVFF in the memory. Accordingly, the configuration of the computation unit 113 can be simplified in addition to the effects of the first embodiment.

Third Embodiment

A case where an overflow detection method is slightly different to those explained above is explained next. In the first and second embodiments, the overflow detection unit 108 and the computation unit 113 cooperate with each other to detect whether there is an overflow. In a third embodiment, the overflow detection unit 108 automatically determines whether there is an overflow, and the computation unit 113 reads the overflow register OVF and sets it in the overflow flag OVFF.

FIG. 4 is a configuration example of an overflow detection unit and a computation unit of a speed detection device according to the third embodiment of the present invention. When the live-pulse timing value LT has exceeded the maximum value, the overflow detection unit 108 sets the overflow register OVF and clears the overflow register OVF according to the pulse edge PE. That is, in the first and second embodiments, the overflow register OVF is cleared by an interrupt process performed by the computation unit 113. However, in the third embodiment, it is configured to clear the overflow register OVF according to the pulse edge PE. Furthermore, the overflow detection unit 108 is configured to hold the value (1 or 0) of the overflow register OVF at the timing of the capture clock CK_CAP. The computation unit 113 reads the overflow register OVF held by the overflow detection unit 108 and sets it in the overflow flag OVFF.

As explained above, in the speed detection device 1 according to the third embodiment, the overflow detection unit 108 determines whether an overflow has occurred. Accordingly, the configuration of the computation unit 113 can be further simplified in addition to the effects of the first embodiment.

Fourth Embodiment

A fourth embodiment in which the configuration of the computation unit 113 according to the third embodiment is changed is explained next. In the fourth embodiment, the change is made for a case where, although the number of bits of the pulse counting unit 107 and the number of bits of the pulse timing unit 109 cannot be largely increased due to a restriction of hardware or the like, it is desired to increase a base time (that is, a calculation period) which is a denominator for obtaining a frequency for the purpose of improving accuracy.

Figure 10:
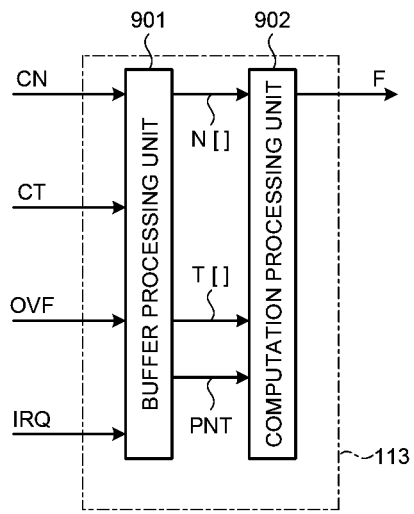
FIG. 10 is a configuration example of a computation unit according to a fourth embodiment of the present invention.

FIG. 10 is a configuration example of the computation unit according to the fourth embodiment of the present invention. The diagrams related to the speed detection device 1 according to the fourth embodiment are FIGS. 10 to 14. The speed detection device 1 according to the fourth embodiment is designed to maintain a small size of the hardware (the number of bits of the pulse counting unit 107, and the pulse timing unit 109) by placing a slight burden on the software.

The computation unit 113 shown in FIG. 10 includes a buffer processing unit 901 and a computation processing unit 902.

The buffer processing unit 901 does not obtain a frequency but performs writing in a ring buffer according to the interrupt request IRQ. A part that calculates the frequency is shifted to the computation processing unit 902 for each calculation period Tcal. More specifically, the buffer processing unit 901 includes a pulse-counting ring buffer N[ ] that stores therein a value of the pulse counting register CN in a time-series manner, a pulse-timing ring buffer T[ ] that stores therein a value of the pulse timing register CT in a time-series manner, and a ring buffer pointer PNT that holds the current position of the ring buffer.

The computation processing unit 902 is started at each calculation period Tcal (a predetermined calculation period), which is an integer multiple of the capture clock period, to calculate the frequency computation value F based on data buffered by the buffer processing unit 901.

Figure 11:
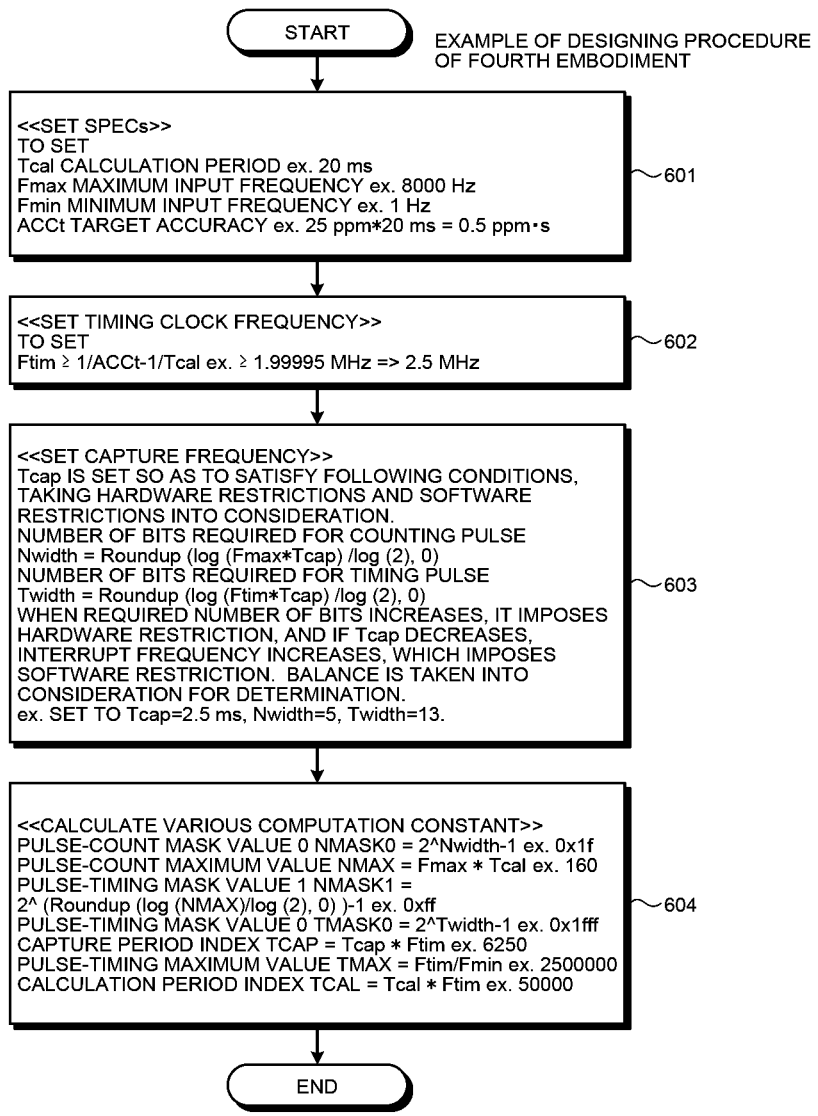
FIG. 11 is an example of a designing procedure of a speed detection device according to the fourth embodiment of the present invention.

FIG. 11 is an example of a designing procedure of the speed detection device according to the fourth embodiment of the present invention.

Specs Setting Step 601

The calculation period Tcal, the maximum input frequency Fmax, the minimum input frequency Fmin, and the target accuracy ACCt are set. For example, these are set as follows:

Calculation period Tcal=20 ms;
Maximum input frequency Fmax=8000 Hz;
Minimum input frequency Fmin=1 Hz; and
Target accuracy ACCt=25 ppm×20 ms=0.5 ppm·s.

Timing-Clock Frequency Setting Step 602

Ftim≥1/ACCt−1/Tcal, for example, ≥1.99995 MHz, and it is set to 2.5 MHz here.

Capture-Frequency Setting Step 603

The capture period Tcap is set so as to satisfy the following conditions, taking hardware restrictions and software restrictions into consideration.

Number of bits required for counting pulse:

$$N\text{width}=\text{Roundup}(\log(F\text{max}\times T\text{cap})/\log(2),0)$$

Number of bits required for timing pulse:

$$T\text{width}=\text{Roundup}(\log(F\text{tim}\times T\text{cap})/\log(2),0)$$

When the required number of bits increases, it imposes a hardware restriction, and when Tcap decreases, the interrupt frequency increases, which imposes a software restriction. Balance is taken into consideration for determination. For example, setting is performed such that Tcap=2.5 ms, Nwidth=5, and Twidth=13.

Various Computation Constant Calculation Step 604

Various constants are obtained. These values are used by the computation unit 113 described later.

| | |
|---|---|
| Pulse-count mask value 0 (first mask value) | NMASK0 = 2^Nwidth−1 |
| Pulse-count maximum value | NMAX = Fmax × Tcal |
| Pulse-count mask value 1 (second mask value) | NMASK1 = 2^(Roundup(log(NMAX)/log(2), 0))−1 |
| Pulse-timing mask value 0 | TMASK0 = 2^Twidth−1 |
| Capture period index | TCAP = Tcap × Ftim |
| Pulse-timing maximum value | TMAX = Ftim/Fmin |
| Calculation period index | TCAL = Tcal × Ftim |

For example, the above values become 0x1f, 160, 0xff, 0x1fff, 6250, 2500000, and 50000 respectively.

Figure 12:
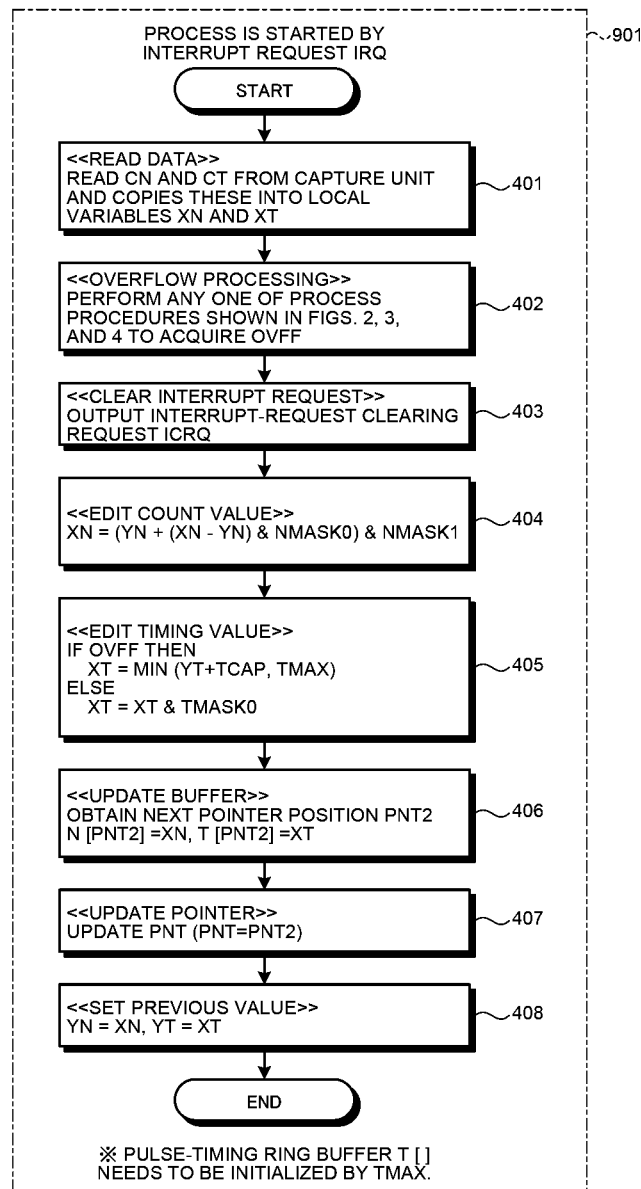
FIG. 12 is an example of a process procedure of a buffer processing unit in FIG. 10.

FIG. 12 is an example of a process procedure of the buffer processing unit in FIG. 10. The buffer processing unit 901 is started by the interrupt request IRQ, and includes, as primary constituent elements, a data read step 401, an overflow processing step 402, an interrupt-request clearing step 403, a count-value editing step 404, a timing-value editing step 405, a buffer updating step 406, a pointer updating step 407, and a previous-value setting step 408.

Data Read Step 401

The buffer processing unit 901 reads CN and CT from the capture unit 110 and copies these values into local variables XN and XT, respectively.

Overflow Processing Step 402

The buffer processing unit 901 performs any one of process procedures shown in FIGS. 2, 3, and 4 to acquire an overflow flag OVFF.

Interrupt-Request Clearing Step 403

The buffer processing unit 901 outputs the interrupt-request clearing request ICRQ.

Count-Value Editing Step 404

The buffer processing unit 901 obtains a bit-extended value XN for the calculation period Tcal from the capture period Tcap according to the following equation.

$$XN=(YN+(XN-YN)\&NMASK0)\&NMASK1$$

That is, the buffer processing unit 901 obtains the number of pulse edges input during a period from the previous interrupt to the current interrupt based on a logical product of NMASK0 and a value obtained by subtracting a value of a pulse counting register YN at the previous interrupt from a value of a pulse counting register XN at the current interrupt. Furthermore, the buffer processing unit 901 obtains current pulse count data (XN) by a logical product of NMASK1 and a value obtained by adding the number of pulse edges input during the period from the previous interrupt to the current interrupt to previous pulse count data (YN).

Timing-Value Editing Step 405

The buffer processing unit 901 obtains a time XT from the last input of the pulse edge PE to the capture clock CK_CAP according to the following equation.

When OVFF=0, that is, there is no overflow, $$XT=XT\&TMASK0.$$

That is, when the pulse timing unit 109 has not overflowed, the buffer processing unit 901 obtains pulse timing data XT based on the value of the pulse timing register CT.

In other cases, $$XT=\text{MIN}(YT+TCAP,TMAX).$$

That is, when the pulse timing unit 109 has overflowed, the buffer processing unit 901 adds the predetermined value of constant (TCAP) obtained by capture clock period/timing clock period to the previous pulse timing data (YT), to obtain the pulse timing data (XT), which is a time since the last pulse edge PE/timing clock period.

Buffer Updating Step 406

The buffer processing unit 901 obtains a position PNT2 of the next ring buffer pointer.

The buffer processing unit 901 updates the ring buffer according to the following equations.

$$N[PNT2]=XN$$

$$T[PNT2]=XT$$

Pointer Updating Step 407

The buffer processing unit 901 updates the ring buffer pointer PNT.

Previous-Value Setting Step 408

The buffer processing unit 901 sets the previous values according to the following equations.

$$YN=XN$$

$$YT=XT$$

Note that the pulse-timing ring buffer T[ ] needs to be initialized by the pulse-count maximum value IMAX.

Figure 13:
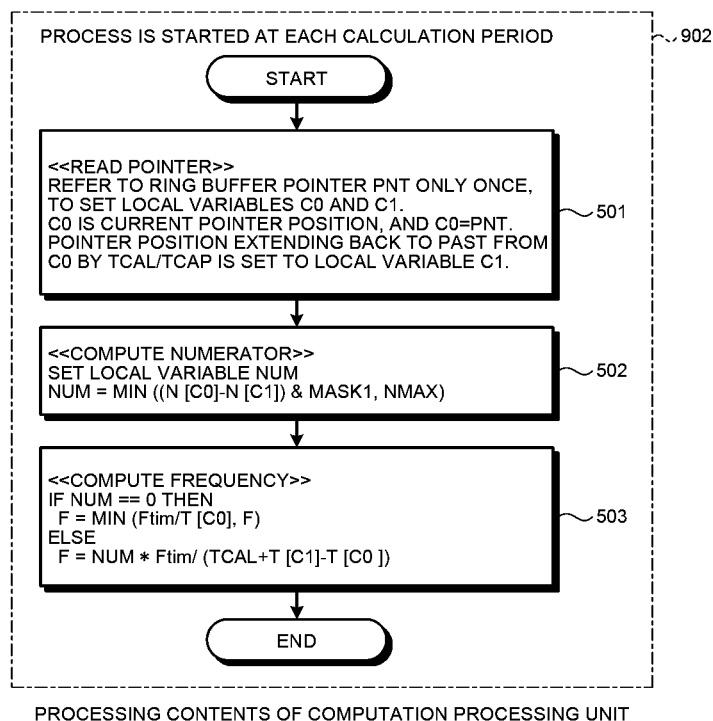
FIG. 13 is an example of a process procedure of a computation processing unit in FIG. 10.

FIG. 13 is an example of a process procedure of the computation processing unit in FIG. 10. The computation processing unit 902 is started at each calculation period Tcal and includes, as primary constituent elements, a pointer read step 501, a numerator computing step 502, and a frequency computing step 503 for obtaining the frequency computation value F.

Pointer Read Step 501

The computation processing unit 902 refers to the ring buffer pointer PNT only once, to set a current pointer position in a local variable C0, and set a pointer position extending back from C0 by TCAL/TCAP in a local variable C1.

Numerator Computing Step 502

The computation processing unit 902 obtains NUM according to the following equation.

NUM=MIN((*N[C0]*−*N[C*1])&MASK1,*N*MAX)

That is, the computation processing unit 902 obtains 'with reference to the ring buffer' the number of pulse edges NUM input during the predetermined calculation period based on a logical product of MASK1 and a value obtained by subtracting pulse count data (N[C1]) at the position extending back by the predetermined calculation period (TCAL/TCAP) from current pulse count data (N[C0]).

Frequency Computing Step 503

The computation processing unit 902 obtains F according to the following equation.

When NUM is 0,

*F*=MIN(*F*tim/*T[C0]*,*F*), and in other cases,

*F*=NUM×*F*tim/(*T*CAL+T[C1]−*T[C*0]).

Figure 14:
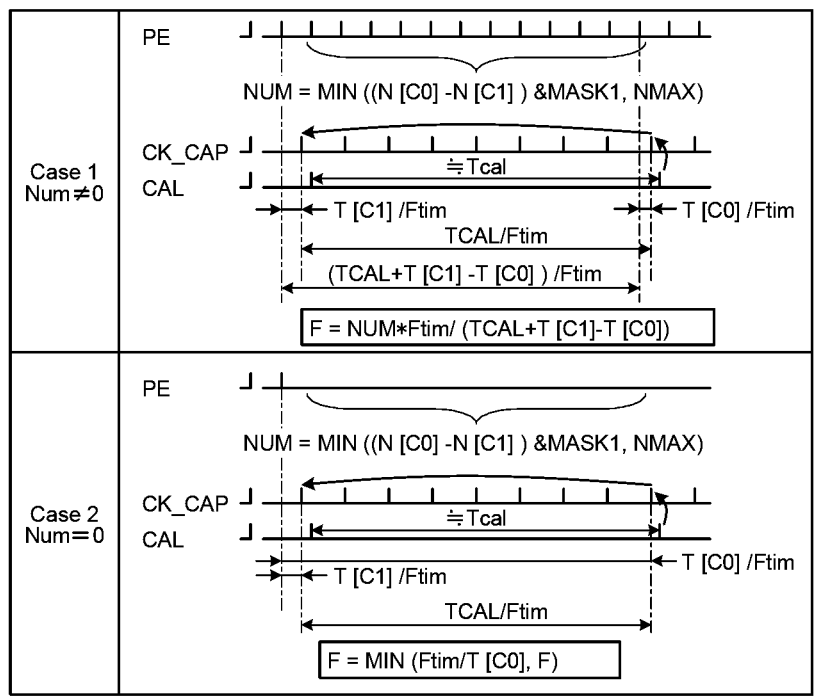
FIG. 14 is an explanatory diagram of processing contents of the computation unit in FIG. 10.
Figure 15:
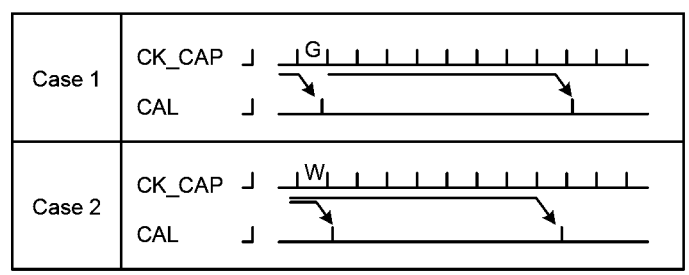
FIG. 15 is an explanatory diagram of other processing contents of the computation unit in FIG. 10.

The process performed by the computation unit 113 is explained with reference to FIGS. 14 and 15. FIG. 14 is an explanatory diagram of processing contents of the computation unit in FIG. 10, and FIG. 15 is an explanatory diagram of other processing contents of the computation unit in FIG. 10.

In FIG. 14, a CASE 1 represents an example in which at least one pulse edge PE has been input. In FIG. 14, NUM is 12, and there are 12 pulse periods in a section described as (TCAL+T[C1]−T[C0])/Ftim. Therefore, it can be understood that there is no problem with the value of NUM as the numerator of an equation for obtaining the frequency.

Regarding the denominator of the equation for obtaining the frequency computation value F, that is, the time for 12 periods, it is obvious that (TCAL+T[C1]−T[C0])/Ftim is correct because the left side is longer by T[C1]/Ftim and the right side is shorter by T[C0]/Ftim than the time described as TCAL/Ftim, as is understood from the description of (TCAL+T[C1]−T[C0])/Ftim.

Accordingly, it is understood that "F=NUM×Ftim/(TCAL+T[C1]−T[C0])" is correct as the equation for obtaining the frequency computation value F.

A CASE 2 represents a state where no pulse edge PE has been input. At this time, it cannot be said that there is no information because no pulse edge PE has been input. It means that only T[C0]/Ftim has passed since the last pulse edge PE at the present moment. Therefore, it is obvious that the frequency is smaller than Ftim/T[C0]. Accordingly, the computation unit 113 outputs the previous frequency computation value F or Ftim/T[C0], whichever smaller, as a new frequency computation value F. That is, an equation "F=MIN (Ftim/T[C0], F)" is used.

"CAL" in FIG. 15 represents a portion where the computation unit 113 is operating. However, this portion does not identical with the calculation period Tcal, and slightly fluctuates every time for the convenience of load variation of the software. This does not at all affect the computation. It is because by referring to the ring buffer pointer PNT only once at the pointer read step 501, the position of the capture data immediately before is stored, and by extending back the pointer by the predetermined number, data during the calculation period Tcal can be referred to. Therefore, although very rare, when the computation unit 113 operates at the timing shown in FIG. 15, in a CASE 1, data in a section denoted by G (gap) in FIG. 15 is not used, and in a CASE 2, data in a section denoted by W (wrap) in FIG. 15 is used twice.

Figure 19:
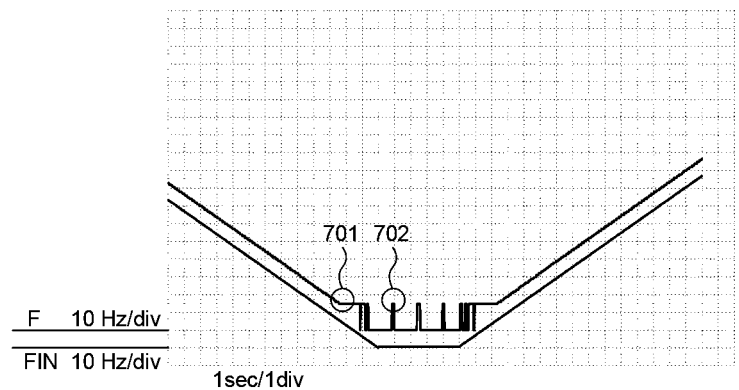
FIG. 19 is an example of a simulation result acquired by the speed detection device described in Patent Literature 1.

A simulation result is explained with reference to FIGS. 19 and 20. FIG. 19 is an example of a simulation result acquired by the speed detection device described in Patent Literature 1, and FIG. 20 is an example of a simulation result acquired by the speed detection device according to the fourth embodiment of the present invention.

In FIG. 19, in the conventional speed detection device, in the operation shown by 701, the reason why the frequency computation value F saturates at 15.3 hertz is that it is a period during which the pulse signal P is not input. Further, in the conventional speed detection device, as shown by the operation shown by 702, when the input signal IN is input only for one pulse from the state of the input frequency being 0, the lowest recognizable frequency is recognized.

Figure 20:
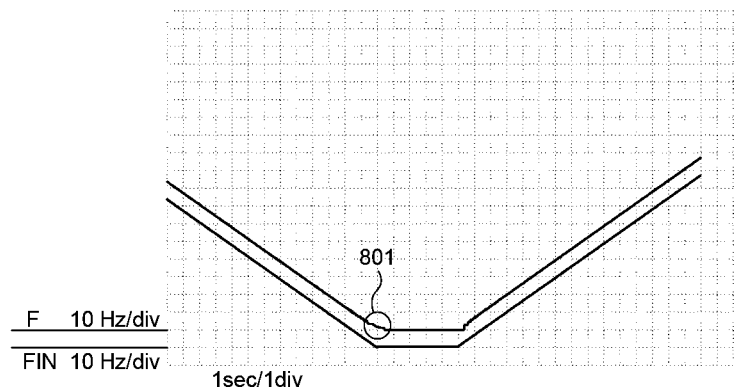
FIG. 20 is an example of a simulation result acquired by the speed detection device according to the fourth embodiment of the present invention.

In FIG. 20, in the speed detection device 1 according to the fourth embodiment, data acquisition is performed regularly by the timing clock CK_TIM, regardless of whether the pulse edge PE is input. When the operation denoted by 801 in FIG. 20 is compared with the operation denoted by 701 in FIG. 19, any saturation as seen in the operation denoted by 701 in FIG. 19 is not seen in the operation denoted by 801 in FIG. 20. Furthermore, such a phenomenon that the lowest frequency is recognized as seen in the operation denoted by 702 in FIG. 19 is not seen in the operation denoted by 801 in FIG. 20.

As explained above, according to the speed detection device 1 of the fourth embodiment, a smaller size of the hardware (the number of bits of the pulse counting unit 107, and the pulse timing unit 109) can be maintained only by placing a slight burden on the software. Although there is a rare case where data is not used and lost as in the speed detection device described in Patent Literature 1, it cannot be said as accuracy deterioration of frequency.

Fifth Embodiment

Figure 16:
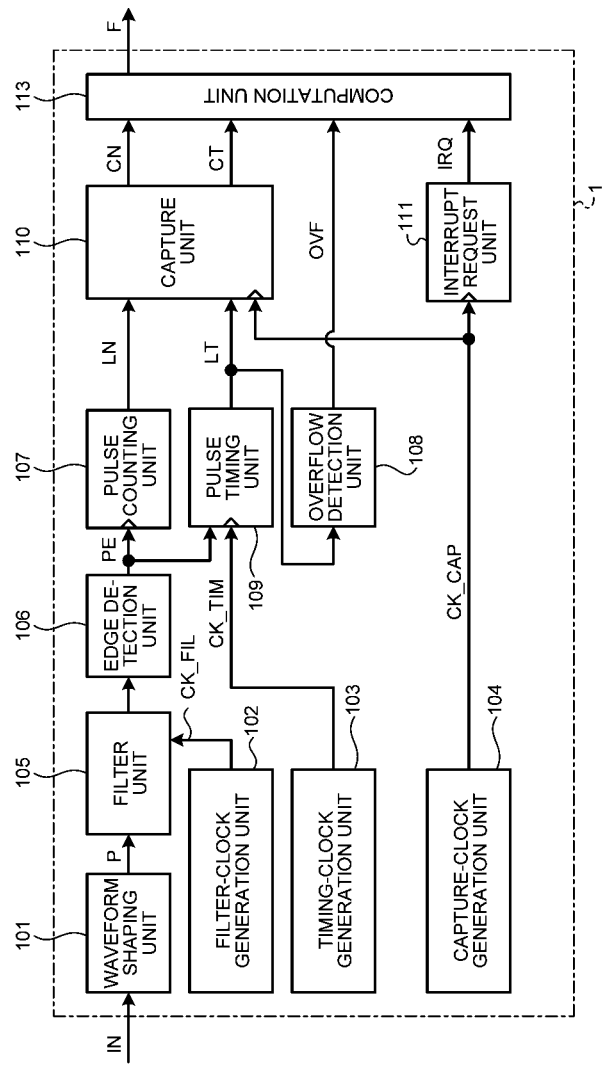
FIG. 16 is a configuration example of a speed detection device according to a fifth embodiment of the present invention.

A fifth embodiment in which a filter unit 105 is added to remove an influence of noise is explained next. FIG. 16 is a configuration example of a speed detection device according to the fifth embodiment of the present invention. In the fifth embodiment, constituent elements identical to those of the first embodiment are denoted by like reference signs and only features different from those of the first embodiment are explained.

The speed detection device 1 shown in FIG. 16 includes, as primary constituent elements, the waveform shaping unit 101, a filter-clock generation unit 102, the filter unit 105, the edge detection unit 106, the pulse counting unit 107, the timing-clock generation unit 103, the pulse timing unit 109, the capture-clock generation unit 104, the overflow detection unit 108, the capture unit 110, the interrupt request unit 111, and the computation unit 113. In the fifth embodiment, as elements different from the first embodiment, the filter unit 105 for removing noise, which is installed at a subsequent stage of the waveform shaping unit 101, and the filter-clock generation unit 102 that supplies a necessary clock to the filter unit 105 are provided.

The filter unit 105 is configured to change an output under a condition of consecutive matches for the predetermined number of times, by sampling the pulse signal P by a filter clock CK_FIL.

Noise frequencies are generally high, and when noise is mixed in a circuit, the pulse signal P changes at a high speed. Therefore, when the filter clock CK_FIL and the number of consecutive matches are set appropriately, noise components can be completely cut. Furthermore, when the noise is not superimposed on the input signal IN, but an output waveform of the waveform shaping unit 101 is vibrating, high frequency components are contained as in the noise. However, a filter circuit can remove the noise as well in this case. Further, because the filter unit 105 is a filter, although slight response delay occurs, it is sufficiently shorter than the capture period Tcap, and does not at all affect the system at a subsequent stage (not shown).

There is an important point in setting the filter. The waveform shaping unit 101 may provide electrical insulation by using a photocoupler. In this case, when a high frequency is input to the input signal IN, even when a duty ratio of the input signal IN is 50:50, a duty ratio of the pulse signal P may largely deviate, due to a difference between an ON time and an OFF time of the photocoupler. A band obtained by the filter clock CK_FIL and the number of consecutive matches needs to be set to a band sufficiently higher than an actually used band, taking a deviation of the duty ratio into consideration. For example, it can be a band capable of being recognized even when the duty ratio of the pulse signal P is 1:99 at the maximum input frequency in the specs.

As explained above, the speed detection device 1 according to the fifth embodiment includes the filter unit 105 installed at a subsequent stage of the waveform shaping unit 101, to change an output under the condition of several consecutive matches by sampling the pulse signal P by the filter clock CK_FIL. Accordingly, in addition to the effects acquired by the first to fourth embodiments, a high noise filtering effect can be acquired even when the output waveform of the waveform shaping unit 101 is vibrating.

Sixth Embodiment

Figure 17:
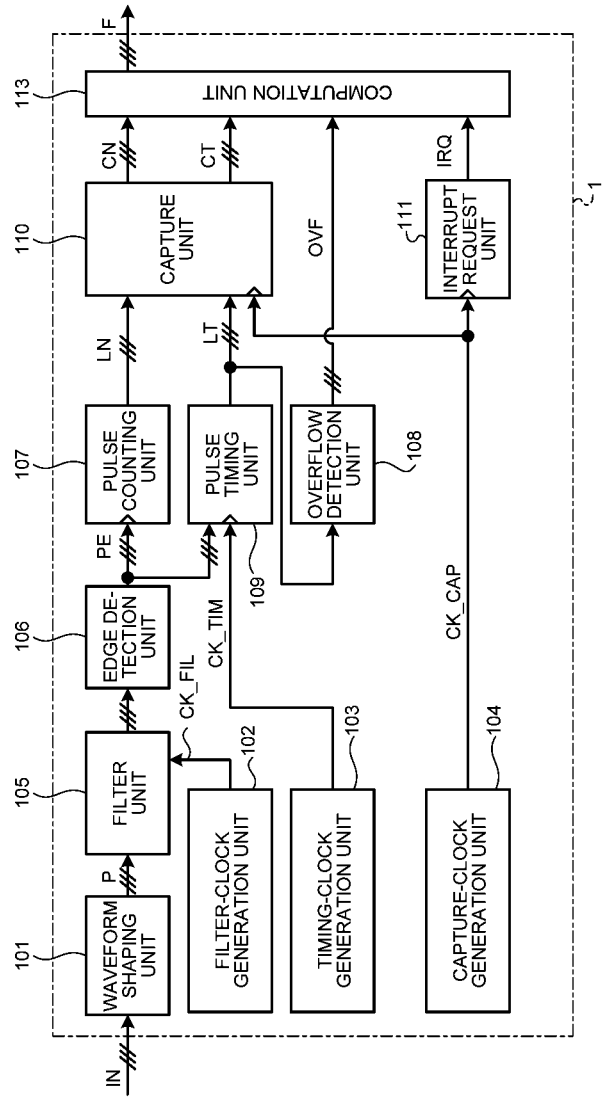
FIG. 17 is a configuration example of a speed detection device according to a sixth embodiment of the present invention.

A sixth embodiment in which the speed detection device 1 is multi-channeled is explained next. FIG. 17 is a configuration example of a speed detection device according to the sixth embodiment of the present invention. In the sixth embodiment, constituent elements identical to those of the fifth embodiment are denoted by like reference signs and only features different from those of the fifth embodiment are explained.

The speed detection device 1 in FIG. 17 includes, as a major configuration, the waveform shaping unit 101, the filter-clock generation unit 102, the filter unit 105, the edge detection unit 106, the pulse counting unit 107, the timing-clock generation unit 103, the pulse timing unit 109, the capture-clock generation unit 104, the overflow detection unit 108, the capture unit 110, the interrupt request unit 111, and the computation unit 113. In the sixth embodiment, as the elements different from the first embodiment, the filter unit 105 for removing noise, which is installed at a subsequent stage of the waveform shaping unit 101, and the filter-clock generation unit 102 that supplies a necessary clock to the filter unit 105 are provided.

The speed detection device 1 in FIG. 17 includes all of the waveform shaping unit 101, the filter unit 105, the edge detection unit 106, the pulse counting unit 107, the pulse timing unit 109, the overflow detection unit 108, and the capture unit 110 in plural, and further includes the filter-clock generation unit 102, the timing-clock generation unit 103, the capture-clock generation unit 104, and the interrupt request unit 111. That is, the speed detection device 1 in FIG. 17 has such a configuration that the filter-clock generation unit 102, the timing-clock generation unit 103, the capture-clock generation unit 104, and the interrupt request unit 111 are shared by a plurality of channels.

As explained above, the speed detection device 1 according to the sixth embodiment shares the timing-clock generation unit 103, the capture-clock generation unit 104, the filter-clock generation unit 102, and the interrupt request unit 111. Therefore, even in a multi-channeled case, the occurrence frequency of the interrupt request IRQ does not change, and thus software overhead can be suppressed. In the speed detection device described in Patent Literature 1, because the interrupt request IRQ occurs randomly for each channel when the speed detection device is multi-channeled, there is such a problem that the interrupt request IRQ increases the interrupt frequency, to incur the software overhead. In the speed detection device 1 according to the sixth embodiment; however, even when the speed detection device is multi-channeled, the occurrence frequency of the interrupt request IRQ does not change, thereby enabling to suppress the software overhead.

The speed detection device according to the first to sixth embodiments of the present invention includes the waveform shaping unit 101, the edge detection unit 106, the timing-clock generation unit 103, and the capture-clock generation unit 104. However, the configuration of the speed detection device is not limited thereto, and the waveform shaping unit 101, the edge detection unit 106, the timing-clock generation unit 103, and the capture-clock generation unit 104 can be installed outside of the speed detection device, and the pulse edge PE, the capture clock CK_CAP, and the timing clock CK_TIM acquired therefrom can be used.

while the speed detection device according to the first to sixth embodiments of the present invention has been explained as a speed detection device used in a railway vehicle, the speed detection device can be applied to any type of devices that measure a frequency signal. In addition, the present invention can be carried out while making various modifications without departing from the scope of the invention.

INDUSTRIAL APPLICABILITY

As described above, the speed detection device according to the present invention can be applied not only to a speed detection device for a railway vehicle but also to any type of devices that measure a frequency signal. Particularly, the speed detection device according to the present invention is useful as an invention in which there is no accuracy deterioration of frequency, data is constantly updated, its circuit size is relatively small, and software overhead can be reduced.

REFERENCE SIGNS LIST

1 SPEED DETECTION DEVICE
101 WAVEFORM SHAPING UNIT
102 FILTER-CLOCK GENERATION UNIT
103 TIMING-CLOCK GENERATION UNIT
104 CAPTURE-CLOCK GENERATION UNIT
105 FILTER UNIT
106 EDGE DETECTION UNIT
107 PULSE COUNTING UNIT
108 OVERFLOW DETECTION UNIT
109 PULSE TIMING UNIT
110 CAPTURE UNIT
111 INTERRUPT REQUEST UNIT
113 COMPUTATION UNIT (FREQUENCY CALCULATION UNIT)
701, 702, 801 WAVEFORM OF FREQUENCY COMPUTATION VALUE
901 BUFFER PROCESSING UNIT
902 COMPUTATION PROCESSING UNIT
ACCt TARGET ACCURACY
CK_CAP CAPTURE CLOCK
CK_FIL FILTER CLOCK
CK_TIM TIMING CLOCK
CN PULSE COUNTING REGISTER

CT PULSE TIMING REGISTER
F FREQUENCY COMPUTATION VALUE
Fmax MAXIMUM INPUT FREQUENCY
Fmin MINIMUM INPUT FREQUENCY
Ftim TIMING CLOCK FREQUENCY
ICRQ INTERRUPT-REQUEST CLEARING REQUEST
IN INPUT SIGNAL
IRQ INTERRUPT REQUEST
LN LIVE-PULSE COUNT VALUE
LT LIVE-PULSE TIMING VALUE
N[ ] PULSE-COUNTING RING BUFFER
NMASK0 PULSE-COUNT MASK VALUE 0 (FIRST MASK VALUE)
NMASK1 PULSE-COUNT MASK VALUE 1 (SECOND MASK VALUE)
NMAX PULSE-COUNT MAXIMUM VALUE
NUM NUMBER OF PULSE EDGE
Nwidth NUMBER OF BIT REQUIRED FOR COUNTING PULSE
OVF OVERFLOW REGISTER
OVFF OVERFLOW FLAG
P PULSE SIGNAL
PE PULSE EDGE (PULSE)
PNT RING BUFFER POINTER
T[ ] PULSE-TIMING RING BUFFER
TCAL CALCULATION PERIOD INDEX
TCAP CAPTURE PERIOD INDEX (PREDETERMINED CONSTANT)
Tcap CAPTURE PERIOD
Tcal CALCULATION PERIOD
TMASK0 PULSE-TIMING MASK VALUE 0
TMAX PULSE-TIMING MAXIMUM VALUE
Twidth NUMBER OF BIT REQUIRED FOR TIMING PULSE

The invention claimed is:

1. A speed detection device comprising:
a pulse counting unit that counts number of pulses of an input signal from outside;
a pulse timing unit that counts up a value by a timing clock and the value is cleared by a pulse, thereby measuring a period of time from a last pulse;
an overflow detection unit that detects that the pulse timing unit has overflowed and holds a detected result in an overflow register;
a capture unit that holds an output from the pulse counting unit in a pulse counting register and holds an output from the pulse timing unit in a pulse timing register, by outputting an interrupt request at a timing of a capture clock for acquiring a measurement result at each constant period; and
a frequency calculation unit that reads a value of the pulse counting register, a value of the pulse timing register, and a value of the overflow register to calculate a frequency computation value by a predetermined computation, wherein
when the pulse timing unit has overflowed, the frequency calculation unit adds a predetermined constant acquired by a period of the capture clock/a period of the timing clock at a previous interrupt to pulse timing data, which is a period of time from the last pulse/a period of the timing clock at a previous interrupt, to obtain second pulse timing data, which is a period of time from the last pulse/a period of the timing clock, thereby calculating the frequency computation value, and
when the number of pulses input during a predetermined period is 0, the frequency calculation unit estimates a frequency computation value by selecting a lower one of a frequency computation value obtained by assuming that a pulse is input immediately thereafter or a previous frequency computation value.

2. The speed detection device according to claim 1, wherein
the overflow detection unit is configured to set the overflow register upon detection that the pulse timing unit has exceeded a predetermined maximum value, and to hold the overflow register until it is cleared by the frequency calculation unit, and
when there is a difference between a value of the pulse counting register at a previous interrupt and a value of the pulse counting register at a current interrupt, the frequency calculation unit determines that an overflow has not occurred and clears the overflow register, and
when there is no difference between the value of the pulse counting register at the previous interrupt and the value of the pulse counting register at the current interrupt, the frequency calculation unit determines whether an overflow has occurred based on a value of the overflow register.

3. The speed detection device according to claim 1, wherein
the overflow detection unit is configured to set the overflow register upon detection that the pulse timing unit has exceeded a predetermined maximum value, and to hold the overflow register until it is cleared by the frequency calculation unit, and
when the overflow register has been set, the frequency calculation unit sets an overflow flag indicating an occurrence of overflow in a predetermined memory and clears the overflow register, and
when there is a difference between a value of the pulse counting register at a previous interrupt and a value of the pulse counting register at a current interrupt, the frequency calculation unit determines that an overflow has not occurred and clears the overflow flag.

4. The speed detection device according to claim 1, wherein
the overflow detection unit sets an overflow bit upon detection that the pulse timing unit has exceeded a predetermined maximum value and clears the overflow bit by a pulse, and
holds the overflow bit in the overflow register at the timing of the capture clock.

5. The speed detection device according to claim 1, wherein
the frequency calculation unit includes pulse timing data as a variable for extending and holding number of bits of the pulse timing register,
obtains the number of pulses input during a period from a previous interrupt to a current interrupt based on a value obtained by subtracting a value of the pulse counting register at the previous interrupt from a value of the pulse counting register at the current interrupt, and
obtains pulse timing data based on a value of the pulse timing register when the pulse timing unit has not overflowed, or
obtains pulse timing data as a period of time from the last pulse/the timing clock, by adding a predetermined constant acquired by a period of the capture clock/a period of the timing clock to the previous pulse timing data, when the pulse timing unit has overflowed,
thereby obtaining a frequency computation value according to a following arithmetic expression:

when NUM is not 0, $$F=NUM\times Ftim\div(TCAP+YT-XT);\text{ and}$$

when NUM=0, $$F=MIN(Ftim\div XT,F),$$

where
F shown in a right-hand member represents a previous frequency computation value,
F shown in a left-hand member represents a current frequency computation value,
NUM represents the number of pulses input during a period from the previous interrupt to the current interrupt,
Ftim represents a timing clock frequency,
TCAP represents a predetermined constant obtained by dividing the period of the capture clock by the period of the timing clock,
XT represents pulse timing data, which is a period of time from the last pulse/a period of the timing clock at the current interrupt, and
YT represents previous pulse timing data as a period of time from the last pulse/a period of the timing clock at the previous interrupt.

6. The speed detection device according to claim 1, wherein
the frequency calculation unit includes
a buffer processing unit that reads a value of the pulse counting register, a value of the pulse timing register, and a value of the overflow register to perform buffering, and
a computation processing unit started at each calculation period, which is an integer multiple of a capture clock period, to calculate a frequency computation value based on data buffered by the buffer processing unit,
the buffer processing unit includes a ring buffer that stores therein a value of the pulse counting register and a value of the pulse timing register in a time-series manner, and a ring buffer pointer that holds a current position of the ring buffer,
obtains the number of pulses input during a period from a previous interrupt to a current interrupt by a logical product of a first mask value and a value obtained by subtracting a value of the pulse counting register at the previous interrupt from a value of the pulse counting register at the current interrupt,
obtains current pulse count data by a logical product of a second mask value and a value obtained by adding the number of pulses input during the period from the previous interrupt to the current interrupt to previous pulse count data,
where the mask value is expressed in a form of a power of 2-1, and the second mask value is larger than the first mask value,
the buffer processing unit obtains pulse timing data based on a value of the pulse timing register, when the pulse timing unit has not overflowed, or
when the pulse timing unit has overflowed, obtains the pulse timing data, which is a period of time from the last pulse/the timing clock, by adding a predetermined constant acquired by a period of the capture clock/a period of the timing clock to previous pulse timing data, and
updates the pointer after storing the pulse count data and the pulse timing data at a position next to the current position of the ring buffer, and
the computation processing unit refers to a value of the pointer to obtain a current pointer position and a pointer position extending back to a past by the calculation period from the current pointer position,
refers to the ring buffer to obtain the number of pulses input during the calculation period by a logical product of the second mask value and a value obtained by subtracting pulse count data in the past by the calculation period from current pulse count data, and
obtains a frequency computation value according to a following arithmetic expression:
when NUM is not 0, $$F=NUM\times Ftim\div(TCAL+T[C1]-T[C0]);\text{ and}$$

when NUM=0, $$F=MIN(Ftim\div T[C0],F),$$

where
F shown in a right-hand member represents the previous frequency computation value,
F shown in a left-hand member represents the current frequency computation value,
NUM represents the number of pulses input during the calculation period,
Ftim represents a timing clock frequency,
TCAL represents a predetermined constant obtained by dividing the calculation period by the timing clock period,
T[C0] represents current pulse timing data, and
T[C1] represents pulse timing data in the past by the predetermined calculation period.

7. The speed detection device according to claim 1, comprising:
a wave shaping unit that shapes a waveform of the input signal to convert the input signal to a pulse signal and provides electrical insulation between the input signal and a signal inside the device;
a filter unit installed at a subsequent stage of the waveform shaping unit; and
a filter-clock generation unit that supplies a necessary clock to the filter unit, wherein
the filter unit changes an output under a condition of consecutive matches for a predetermined number of times, by sampling a pulse signal by a filter clock.

8. The speed detection device according to claim 7, comprising an edge detection unit that detects either a rising edge or a falling edge of the pulse and outputs the pulse signal as a pulse edge, the pulse counting unit, the overflow detection unit, the pulse timing unit, the capture unit, and the filter unit in plural, and shares the filter-clock generation unit.

9. A speed detection device comprising:
a pulse counting unit that counts number of pulses of an input signal from outside;
a pulse timing unit that counts up a value by a timing clock and the value is cleared by a pulse, thereby measuring a period of time from a last pulse;
an overflow detection unit that detects that the pulse timing unit has overflowed and holds a detected result in an overflow register;
a capture unit that holds an output from the pulse counting unit in a pulse counting register and holds an output from the pulse timing unit in a pulse timing register, by outputting an interrupt request at a timing of a capture clock for acquiring a measurement result at each constant period; and
a frequency calculation unit that reads a value of the pulse counting register, a value of the pulse timing register, and a value of the overflow register to calculate a frequency computation value by a predetermined computation, wherein when the pulse timing unit has overflowed, the frequency calculation unit adds a predetermined constant acquired by a period of the capture clock/a period of the timing clock to pulse timing data, which is a period of time from the last pulse/a period of the timing clock at a previous interrupt, to obtain second pulse timing data, which is a period of time from the last pulse/a period of the timing clock, thereby calculating the frequency computation value, and the overflow detection unit sets an overflow bit upon detection that the pulse timing unit has exceeded a predetermined maximum value and clears the overflow bit by a pulse, and holds the overflow bit in the overflow register at the timing of the capture clock.

10. A speed detection device comprising:

a pulse counting unit that counts number of pulses of an input signal from outside;

a pulse timing unit that counts up a value by a timing clock and the value is cleared by a pulse, thereby measuring a period of time from a last pulse;

an overflow detection unit that detects that the pulse timing unit has overflowed and holds a detected result in an overflow register;

a capture unit that holds an output from the pulse counting unit in a pulse counting register and holds an output from the pulse timing unit in a pulse timing register, by outputting an interrupt request at a timing of a capture clock for acquiring a measurement result at each constant period; and a frequency calculation unit that reads a value of the pulse counting register, a value of the pulse timing register, and a value of the overflow register to calculate a frequency computation value by a predetermined computation, wherein when the pulse timing unit has overflowed, the frequency calculation unit adds a predetermined constant acquired by a period of the capture clock/a period of the timing clock to pulse timing data, which is a period of time from the last pulse/a period of the timing clock at a previous interrupt, to obtain second pulse timing data, which is a period of time from the last pulse/a period of the timing clock, thereby calculating the frequency computation value, the frequency calculation unit includes pulse timing data as a variable for extending and holding number of bits of the pulse timing register, obtains the number of pulses input during a period from a previous interrupt to a current interrupt based on a value obtained by subtracting a value of the pulse counting register at the previous interrupt from a value of the pulse counting register at the current interrupt, when the pulse timing register has not overflowed, obtains pulse timing data based on the value of the pulse timing register, when the pulse timing register has overflowed, obtains pulse timing data, which is a period of time from the last pulse/the timing clock, by adding a predetermined constant acquired by a period of the capture clock/period of the timing clock to previous pulse timing data, and obtains a frequency computation value according to a following arithmetic expression:

when NUM is not 0, $$F = NUM \times Ftim \div (TCAP + YT - XT); \text{ and}$$

when NUM=0, $$F = MIN(Ftim \div XT, F),$$

where

F shown in a right-hand member represents a previous frequency computation value, F shown in a left-hand member represents a current frequency computation value, NUM represents the number of pulses input during a period from the previous interrupt to the current interrupt, Ftim represents a timing clock frequency, TCAP represents a predetermined constant obtained by dividing the period of the capture clock by the period of the timing clock, XT represents pulse timing data, which is a period of time from the last pulse/a period of the timing clock at the current interrupt, YT represents the previous pulse timing data, which is a period of time from the last pulse/a period of the timing clock at the previous interrupt, and MIN represents a function for returning a minimum value.

* * * * *